US012607369B2

(12) United States Patent
Cameron et al.

(10) Patent No.: US 12,607,369 B2
(45) Date of Patent: Apr. 21, 2026

(54) EVAPORATIVE COOLING PAD FOR AN AIR TREATMENT UNIT

(71) Applicant: MUNTERS EUROPE AKTIEBOLAG, Kista (SE)

(72) Inventors: Ian Vincent Cameron, Ft. Meyers, FL (US); Tiberiu-Andrei Pal-Calinescu, Ventimiglia (IT)

(73) Assignee: Munters Europe Aktiebolag, Kista (SE)

( * ) Notice: Subject to any disclaimer, the term of this patent is extended or adjusted under 35 U.S.C. 154(b) by 341 days.

(21) Appl. No.: 18/563,815

(22) PCT Filed: May 18, 2022

(86) PCT No.: PCT/EP2022/063420
§ 371 (c)(1),
(2) Date: Nov. 22, 2023

(87) PCT Pub. No.: WO2022/248304
PCT Pub. Date: Dec. 1, 2022

(65) Prior Publication Data
US 2024/0240813 A1     Jul. 18, 2024

(30) Foreign Application Priority Data

May 26, 2021    (SE) .................................... 2150667-0

(51) Int. Cl.
*F24F 5/00*       (2006.01)
*B23P 15/26*      (2006.01)
*F24F 6/04*       (2006.01)

(52) U.S. Cl.
CPC ............ *F24F 5/0035* (2013.01); *B23P 15/26* (2013.01); *F24F 6/043* (2013.01);
(Continued)

(58) Field of Classification Search
CPC .... F24F 6/043; F28D 5/00; F28D 5/02; F28D 5/035; B01D 3/008; B01D 3/346;
(Continued)

(56) References Cited

U.S. PATENT DOCUMENTS 4,396,058 A * 8/1983 Kurschner .............. B23P 15/26
                                                                165/8
4,732,713 A   3/1988 Korsell
(Continued)

FOREIGN PATENT DOCUMENTS

CN        102705932 A    10/2012
DE   20 2006 018 753 U1    5/2008
(Continued)

OTHER PUBLICATIONS

Examination Report dated Jan. 28, 2025, in Australian Patent Application No. 2022283514.
(Continued)

*Primary Examiner* — Robert Clemente
(74) *Attorney, Agent, or Firm* — Medler Ferro Woodhouse & Mills PLLC

(57)                   ABSTRACT
An evaporative cooling pad for an air treatment unit includes a first set of corrugated sheets and a second set of corrugated sheets having corrugations defined in a direction transversely of a horizontal plane of the pad, the sheets of the first set being disposed alternatively with the sheets of the second set, with the corrugations of the first set crossing the corrugations of the second set; the crossed corrugations defining passageways penetrating from a first edge to a second edge of the pad, the corrugations of the corrugated sheets bearing against one another so that the sheets touch where at least one of the wave peaks (p1) and wave troughs (t1, t2) of their respective corrugations cross; at least one wave peak (p2) between two wave peaks (p1) of equal
(Continued)

amplitude (a1) of at least one of the first and second set of corrugated sheets has a smaller amplitude (a2) than the wave peaks (p1) of equal amplitude (a1), wherein the wavelength (wl2) of the wave troughs (t1, t2) on each side of the at least one wave peak (p2) with smaller amplitude (a2) is smaller than the wavelength (wl1) of the two wave peaks (p1) of equal amplitude (a1) on each side of the wave peak (p2) with smaller amplitude (a2).

15 Claims, 6 Drawing Sheets

(52) U.S. Cl.
CPC ........................... *B01J 2219/3221* (2013.01); *B01J 2219/3222* (2013.01); *B01J 2219/32258* (2013.01)

(58) Field of Classification Search
CPC . B21D 53/04; B23P 15/26; B01J 19/32; B01J 2219/3221; B01J 2219/32213; B01J 2219/3222; B01J 2219/32258; F28F 3/046; F28F 25/087
See application file for complete search history.

(56) References Cited

U.S. PATENT DOCUMENTS

| | | | |
|---|---|---|---|
| 5,143,658 A | 9/1992 | Thomas | |
| 6,378,332 B1 | 4/2002 | Billingham et al. | |
| 8,590,606 B2 | 11/2013 | Arai et al. | |
| 2009/0294548 A1 | 12/2009 | Geiger et al. | |
| 2010/0218927 A1* | 9/2010 | Cooper | F28F 3/046 |
| | | | 165/185 |
| 2010/0237519 A1 | 9/2010 | Ausner et al. | |
| 2015/0377569 A1 | 12/2015 | Zhang et al. | |
| 2018/0318787 A1 | 11/2018 | Clifford et al. | |
| 2019/0120509 A1 | 4/2019 | Seeley et al. | |
| 2019/0210000 A1* | 7/2019 | Headley | B01D 3/008 |

FOREIGN PATENT DOCUMENTS

| | | | |
|---|---|---|---|
| EP | 3 473 315 A1 | 4/2019 | |
| JP | 64-8031 A | 1/1989 | |
| JP | 2-242729 A | 9/1990 | |
| JP | 6-210121 A | 8/1994 | |
| JP | 2009-526137 A | 7/2009 | |
| JP | 2016-014392 A | 1/2016 | |
| WO | 2008/155810 A1 | 12/2008 | |

OTHER PUBLICATIONS

Office Action dated Feb. 14, 2025, in Japanese Patent Application No. 2023-568588.
Office Action and Search Report dated Feb. 3, 2022, in Swedish Patent Application No. 2150667-0.
International Search Report dated Sep. 16, 2022, in International Patent Application No. PCT/EP2022/063420.

* cited by examiner

I - I

II - II

20 controlling — s101 controlling — s102

EVAPORATIVE COOLING PAD FOR AN AIR TREATMENT UNIT

TECHNICAL FIELD

The present disclosure relates to an evaporative cooling pad for an air treatment unit, an air treatment unit and a method for producing the evaporative cooling pad. Further, the invention relates to a computer program and to a computer-readable medium according to the appended claims.

BACKGROUND ART

Air treatment units, such as evaporative humidifiers and cooler apparatuses, may be used to humidify and cool different types of spaces in buildings. The space may be a space within a building for holding animals. A correct humidity and temperature within the space is important in order for the animals to feel well and stay healthy.

Electric equipment within a building may generate heat, which increases the temperature within the building. Increased temperature may decrease the performance of the equipment. Electric equipment may also be sensitive to static electricity. If the humidity in a space within the building falls below a certain level, static electricity may be generated. A correct humidity and temperature within the space is therefore important the performance of the electric equipment.

Evaporative humidifiers and cooler apparatuses comprises an organic or inorganic non-combustible or combustible cooling and humidification media, also known as an evaporative media, which is a component configured to be exposed to a fluid. The fluid, such as water, is supplied to the top of the evaporative media via a fluid distribution element. The water flows down the evaporative media, which comprises a number of corrugated sheets. As warm and dry air passes through the evaporative media, it evaporates a proportion of the water and thus produces cold, humidified air. The rest of the water is drained to a fluid tray or water gutter.

The warm and dry air may be directed through the evaporative media by means of a forced air flow, which is generated by a fan. The air passes through channels or passageways in the pads, which passageways are created by the corrugated sheets.

Alternatively, the air may pass through the channels or passageways by natural features or convection. The corrugations of the sheets are crossing adjacent sheets wherein said crossed corrugations defining the passageways penetrating from edge to edge of the pad. The corrugations of the corrugated sheets bearing against one another so that the sheets touch where the wave peaks and wave troughs of their respective corrugations cross.

The energy that is needed for the evaporation of the fluid is taken from the air itself. The air that leaves the evaporative humidifier is therefore humidified and cooled simultaneously without any external energy supply for the evaporation due to an adiabatic cooling process.

U.S. Pat. No. 4,732,713 A discloses an insertable contact body for heat exchangers, cooling towers, scrubbers or the like, which body is composed of sheets provided with corrugations. The body comprises adjacent sheets, which are formed with corrugations or folds crossing one another. In one embodiment certain sheets are formed with greater height than the other folds presented in the sheets in order to produce an interspace between the crests of the folds of the sheets. The increased folds in the upper sheet and the lower sheet may at their crossing places be joined together by means of glueing or welding.

U.S. Pat. No. 5,143,658 A discloses a body for use in a liquid and gas contact apparatus and, in particular, to a contact body formed of alternating corrugated sheets of material, wherein the corrugations in adjacent sheets are positioned at an angle to each other. The corrugations of a first set of sheets having a smaller amplitude then the corrugations of a second set of sheets, which first and second sets of sheets are arranged adjacent to each other.

Document US 2018318787 A1 discloses a cross-corrugated structured packing element, which is provided for use in mass transfer or heat exchange columns. The packing element has a plurality of packing sheets positioned in an upright, parallel relationship to each other and including corrugations formed of alternating peaks and valleys. The packing sheets also includes a plurality of apertures. Each of the structured packing sheets is constructed from a rigid material, such as metals, plastics, or ceramics, having sufficient strength and thickness to withstand processing conditions.

SUMMARY OF THE INVENTION

Energy is needed for the fan, which generates the forced air flow through the passageways in the pads. However, a pressure drop arises when the air flow passes through the passageways in the pads. The pressure drop results in increased energy needs for the fan. Further, the passageways restrict the saturation of water in the pads. Further, when producing the evaporative cooling pad adhesives may be needed for bounding the corrugated sheets against one another where the wave peaks and wave troughs of their respective corrugations cross and touch one another.

Thus it would be desirable to develop an evaporative cooling pad for an air treatment unit, an air treatment unit and a method for producing the evaporative cooling pad, which overcomes or alleviates at least some of the drawbacks of the prior art.

An objective of the present invention is to achieve an evaporative cooling pad, in which a reduced pressure drop arises when the air flow passes through the passageways in the pads.

A further objective of the present invention is to achieve an evaporative cooling pad, in which the saturation of water in the pads is increased.

A further objective of the present invention is to achieve a method for producing the evaporative cooling pad, wherein the amount of adhesives needed for bounding the corrugated sheets against one another is reduced.

A further object of the invention is to develop a computer program and a computer-readable medium for executing the method.

These objectives are achieved with the above-mentioned an evaporative cooling pad for an air treatment unit, an air treatment unit and a method for producing the evaporative cooling pad according to the appended claims.

Further, these objectives are achieved with the above-mentioned computer program and computer-readable medium according to the appended claims.

According to an aspect of the invention, an evaporative cooling pad for an air treatment unit is provided. The evaporative cooling pad comprising: a first set of corrugated sheets and a second set of corrugated sheets having corrugations defined in a direction transversely of the horizontal plane of the pad, the sheets of the first set being disposed alternatively with the sheets of the second set, with the corrugations of the sheets of the first set crossing the corrugations of the sheets of the second set; said crossed corrugations defining passageways penetrating from a first edge to a second edge of the pad, the corrugations of said corrugated sheets bearing against one another so that the sheets touch where at least one of the wave peaks and wave troughs of their respective corrugations cross; at least one wave peak between two wave peaks of equal amplitude of at least one of the first and second set of corrugated sheets has a smaller amplitude than the wave peaks of equal amplitude, wherein the wave length of the wave troughs on each side of the at least one wave peak with smaller amplitude is smaller than the wave length of the two wave peaks of equal amplitude on each side of the wave peak with smaller amplitude.

According to a further aspect of the invention an air treatment unit is provided, wherein the air treatment unit comprises an evaporative cooling pad disclosed herein.

An advantage of the invention is that the evaporative cooling pad allows for a stable, reliable and effective treatment of air, and thereby improves the functionality/performance of an air treatment unit. The saturation of water in the evaporative cooling pad is increased. The saturation efficiency will increase due to an increased wetting of the surface of the corrugated sheets. The pressure drop of the air flow through the pads will decrease due to decreased turbulence of the air in the passageways of the pads.

According to a further aspect of the invention a method, performed by a control device, for producing an evaporative cooling pad for an air treatment unit is provided. The method comprising the steps of: controlling a corrugation device for creating corrugated sheets having at least one wave peak between two wave peaks of equal amplitude of at least one of the first and second set of corrugated sheets with a smaller amplitude than the wave peaks of equal amplitude, and wherein the wave length of the wave troughs on each side of the at least one wave peak with smaller amplitude is smaller than the wave length of the two wave peaks of equal amplitude on each side of the wave peak with smaller amplitude; and controlling a connection operation of first set of corrugated sheets and a second set of corrugated sheets where the corrugations of said corrugated sheets touch one another, An advantage of the present invention is that the method for producing the evaporative cooling pad facilitates the production of evaporative cooling pad, which allows for a stable, reliable and effective treatment of air. The amount of adhesives needed for bounding the corrugated sheets against one another during production is reduced. Thus, cost reduction for manufacturing the pads is achieved due to less glue or no glue for connecting the sheets or arranging the sheets adjacent to each other. This will also result in positive environments effects.

According to an aspect of the invention, a computer program is provided, the computer program comprising instructions which, when the program is executed by a computer, cause the computer to carry out the method. Also, a computer-readable medium is provided, the computer-readable medium comprising instructions, which when executed by a computer, cause the computer to carry out the method. This has the advantage that the method may be comprised in pre-programmed software, which may be implemented into the production, suitable for utilizing the method.

Additional objectives, advantages and novel features of the invention will be apparent to one skilled in the art from the following details, and through exercising the invention.

While the invention is described below, it should be apparent that the invention may not be limited to the specifically described details. One skilled in the art, having access to the teachings herein, will recognize additional applications, modifications and incorporations in other areas, which are within the scope of the invention.

BRIEF DESCRIPTION OF THE DRAWINGS

For fuller understanding of the present disclosure and further objects and advantages of it, the detailed description set out below should be read together with the accompanying drawings, in which the same reference notations denote similar items in the various figures, and in which:

FIG. 1b schematically illustrates a section view along line I-I in FIG. 1a;

FIG. 1c schematically illustrates a section view along line II-II in FIG. 1a;

DETAILED DESCRIPTION

Figure 1A:
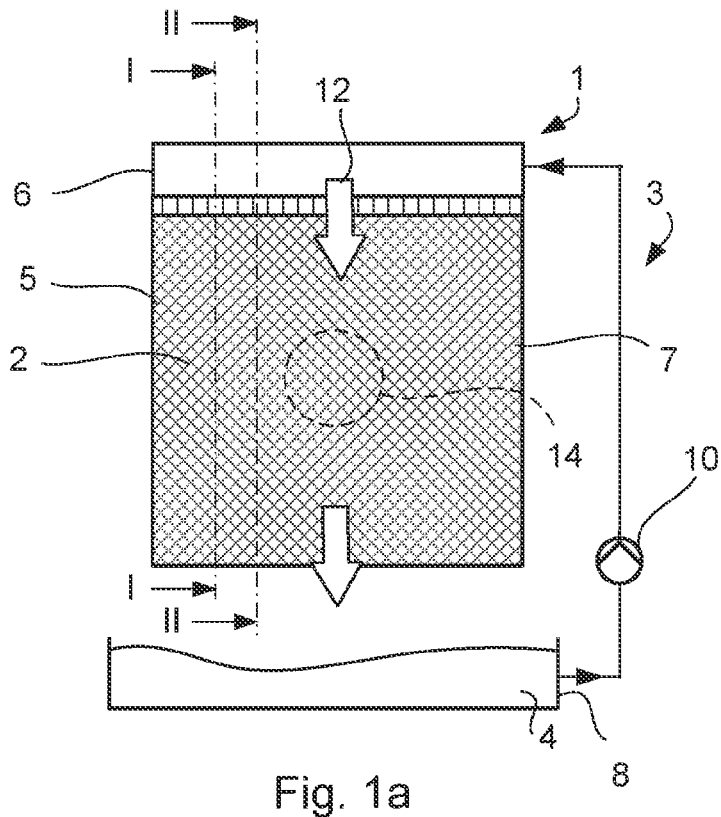
FIG. 1a schematically illustrates a front view of an air treatment unit comprising an evaporative cooling pad according to an example.

The detailed description with reference to the examples depicted are to be viewed as examples comprising a combination of certain features, which features have been described in detail above. It is thus to be understood that additional examples may be achieved by combining other features into examples not depicted herein. The figures are to be viewed as examples and not mutually exclusive combinations. It should also be noted that all figures shown and described are schematically represented, wherein generic parts of machinery or similar is not depicted for the sake of simplicity.

According to an aspect of the present disclosure, an evaporative cooling pad for an air treatment unit is provided. The evaporative cooling pad comprising: a first set of corrugated sheets and a second set of corrugated sheets having corrugations defined in a direction transversely of the horizontal plane of the pad, the sheets of the first set being disposed alternatively with the sheets of the second set, with the corrugations of the sheets of the first set crossing the corrugations of the sheets of the second set; said crossed corrugations defining passageways penetrating from a first edge to a second edge of the pad, the corrugations of said corrugated sheets bearing against one another so that the sheets touch where at least one of the wave peaks and wave troughs of their respective corrugations cross; at least one wave peak between two wave peaks of equal amplitude of at least one of the first and second set of corrugated sheets has a smaller amplitude than the wave peaks of equal amplitude, wherein the wave length of the wave troughs on each side of the at least one wave peak with smaller amplitude is smaller than the wave length of the two wave peaks of equal amplitude on each side of the wave peak with smaller amplitude.

The air treatment unit may be used to humidify and cool different types of spaces in buildings. The air treatment unit may be an evaporative humidifier and cooler apparatus.

The air treatment unit comprises an evaporative cooling pad, which may be an evaporative media or a cooling and humidification media. The evaporative cooling pad is configured to be exposed to a fluid and to evaporate the fluid to which it is exposed.

The evaporative cooling pad may be arranged in cassettes, which are supported by a rigid frame of the air treatment unit. The air treatment unit comprises a fluid distribution element, which is configured to distribute the fluid to the evaporative cooling pad. A tray or water gutter is arranged to collect fluid downstream of the evaporative cooling pad. The fluid distributed by the fluid distribution element is collected from the tray. A fluid pump is connected to the fluid distribution element, wherein the fluid pump is configured to deliver fluid to the fluid distribution element. The fluid pump is arranged at a fluid pipe arranged between the tray and the fluid distribution element. The fluid pump may suck the fluid from the tray and deliver the fluid to the fluid distribution element. A fan is configured to generate an air flow through the evaporative cooling pad. As the warm and dry air flow passes through the evaporative cooling pad, a proportion of the water is evaporated and thus produces cold, humidified air.

The evaporative cooling pad is configured to receive and evaporate the fluid. The evaporative cooling pad comprises a number of corrugated sheets connected to each other, so that passageways are formed between the corrugated sheets. The passageways are penetrating from a first edge to a second edge of the evaporative cooling pad. The air flow created by the fan is configured to flow in the passageways through the evaporative cooling pad. The fan may be arranged on the same side as the second edge of the evaporative cooling pad and the fan thus sucks the air through the passageways. Alternatively, the fan may be arranged to push air through the passageways in the evaporative cooling pad. The first edge of the evaporative cooling pad may be configured as the first surface of the evaporative cooling pad. The second edge of the evaporative cooling pad may be configured as the second surface of the evaporative cooling pad.

The first set of corrugated sheets comprises wave peaks and wave troughs having specific amplitudes, wave heights and wave lengths. The second set of corrugated sheets comprises wave peaks and wave troughs having specific amplitudes, wave heights and wave lengths. The amplitudes, wave heights and wave lengths of the first set of corrugated sheets may be different from the amplitudes, wave heights and wave lengths of the second set of corrugated sheets. The largest wave height may be in the range of 4 mm to 15 mm. According to an example, the largest wave height may be 7 mm. After a certain compression in the assembled evaporative cooling pad, the wave height of the largest waves may be in the range of 2 mm to 8 mm. According to an example, after a certain compression in the assembled evaporative cooling pad, the wave height of the largest waves may be 5 mm.

At least one wave peak between two wave peaks of equal amplitude of at least one of the first and second set of corrugated sheets may have a smaller amplitude than the wave peaks of equal amplitude. Thus, the wave height of the wave with a smaller amplitude may be smaller than the wave height of the waves of equal amplitude on either side of the wave with a smaller amplitude. The first and second set of corrugated sheets may comprise a large number of waves. Therefore, the each of the first and second set of corrugated sheets may comprise several waves with smaller amplitude and several waves with larger amplitude. The radius of the wave peaks and wave trough may be equal or may differ from each other.

The first set of corrugated sheets are defined in a direction transversely of the horizontal plane. The second set of corrugated sheets are also defined in a direction transversely of the horizontal plane. The transversely direction of the corrugations of the first set of sheets may be different than the transversely direction of the corrugations of the second set of sheets. The sheets of the first set are disposed alternatively with the sheets of the second set. The sheets of the first set may be directed in the range of 10°-45° in relation to the horizontal plane of the pad. The sheets of the second set are directed in the range of 30°-60° in relation to the horizontal plane of the pad.

According to an example, the sheets may be connected to each other with a sheet of the first set directed 15° and a sheet of the second set directed 45° in relation to the horizontal plane of the finished pad. A normal to the first surface and/or to the second surface of the evaporative cooling pad may extend within the horizontal plane.

Depending on the configuration of the wave peaks and wave troughs of the waves with smaller amplitude, the corrugations of the first and second set corrugated sheets will bear against one another when arranging the sheets next to and adjacent to each other.

The wave peaks of the waves with smaller amplitude may be arranged at the same level as the wave peaks of the waves with larger amplitude. This will result in that the wave troughs of the waves with smaller amplitude may be arranged at another level as the wave troughs of the waves with larger amplitude.

In the opposite, the wave troughs of the waves with smaller amplitude may be arranged at the same level as the wave troughs of the waves with larger amplitude. This will result in that the wave peaks of the waves with smaller amplitude may be arranged at another level as the wave peaks of the waves with larger amplitude.

This will result in that the first and second set corrugated sheets will touch each other where at least one of the wave peaks and wave troughs of their respective corrugations or waves cross. In addition, the first and second set corrugated sheets will touch each other where at least one of the wave peaks and wave troughs of largest amplitude of their respective corrugations or waves cross.

An evaporative cooling pad may comprise an assembly of more than 20 sheets of the first set and more than 20 sheets of the second set, disposed alternatively with the respective sheets of the first and second set.

Even though the at least one wave peak between two wave peaks of equal amplitude of at least one of the first and second set of corrugated sheets has a smaller amplitude than the wave peaks of equal amplitude, the evaporative cooling pad may have the same or an increased surface area comparing to a evaporative cooling pad comprising corrugated sheets with equal amplitudes. A variation of the surface area may also be achieved by alter the pitch or wave length.

The first and second sets of corrugated sheets may comprise paper, non-woven or plastics.

The wave having a wave peak with smaller amplitude may have a smaller wave length than the wave having a wave peak with larger amplitude. That is, the distance between the wave peak of the wave with smaller amplitude and the wave peak of the wave with larger amplitude may be larger than the distance of two wave troughs of the wave with smaller amplitude.

The wave troughs on each side of the at least one wave peak with smaller amplitude may have the same amplitude. Further, the wave troughs on each side of the at least one wave peak with smaller amplitude may have the same amplitude as the wave troughs on each side of the waves with a larger amplitude.

Such configuration of the wave lengths will result in that the wave peaks of the waves having a smaller amplitude will not contact and will not be connected to an adjacent sheet with their wave peaks. Thus, a reduced pressure drop arises when the air flow passes through the passageways in the pads due to increased cross sections of some of the passageways. This will also result in an increased saturation of water in the pads. Further, the amount of adhesives needed for bounding the corrugated sheets against one another is reduced due to a reduced number of contact between waves in the sheets.

According to an aspect, at least one of the wave troughs on one side of the at least one wave peak with smaller amplitude has a smaller amplitude than the other wave trough.

Between the waves with large wave heights the wave with a smaller or reduced wave height has a wave peak with reduced amplitude and a wave trough with reduced amplitude. Such configuration of the amplitudes will result in that the wave peaks and of the wave troughs will not contact and will not be connected to adjacent sheets with their wave peaks and wave troughs. Thus, a reduced pressure drop of the air flow that passes through the passageways will be achieved. Further, the saturation will increased and the amount of adhesives needed for bounding the corrugated sheets against one another will be reduced.

According to an aspect, at least two consecutive wave peaks between two wave peaks of equal amplitude, have a smaller amplitude than the wave peaks of equal amplitude.

Between the waves with large wave heights two waves with smaller or reduced wave height have wave peaks with reduced amplitude. Such configuration of the reduced amplitude will result in that even more wave peaks of one sheet will not contact and will not be connected to an adjacent sheet. As a result, a reduced pressure drop of the air flow that passes through the passageways will be achieved. Further, the saturation will increased and the amount of adhesives needed for bounding the corrugated sheets against one another will be reduced.

According to an aspect, the at least two consecutive waves peaks between two wave peaks of equal amplitude, have a wave trough there between with an amplitude which is smaller than the amplitude of the wave peaks of equal amplitude on each side of the wave peaks with smaller amplitudes.

Thus, the amplitude of the wave trough between the wave peaks with reduced amplitude will result in that some of the wave peaks and of the wave troughs will not contact and will not be connected to adjacent sheets with their wave peaks and wave troughs. Thus, a reduced pressure drop of the air flow that passes through the passageways will be achieved. Further, the saturation will increased and the amount of adhesives needed for bounding the corrugated sheets against one another will be reduced.

According to an aspect, the wave length of the at least two consecutive waves peaks between the two wave peaks of equal amplitude having a smaller amplitude than the wave peaks of equal amplitude is smaller than the wave length of the two wave peaks of equal amplitude.

The waves with wave peaks with reduced amplitude may have a reduced wave length than the wave having a wave peak with larger amplitude. That is, the distance between the wave peaks of the waves with reduced amplitude may be smaller than the distance between a wave peak of a wave with large amplitude and a wave peak of a wave with reduced amplitude.

According to an aspect, the first and second sets of corrugated sheets are perforated by a number of through openings.

The number of perforations may be large. In order to achieve a large number of perforations, the through openings may be small. The through openings may have a circular configuration. The diameter of the circular through openings may be small.

By perforating the corrugated sheets with through openings will decrease the pressure drop of the air flow through the passageways in the pads and increase the saturation of water in the pads.

According to an aspect, the first and second sets of corrugated sheets comprise paper.

The paper sheets may be treated with substances that increase the life span of the pads and also reduces the need of maintenance of the pads. The substances may be impregnation substances. The paper sheets may increase the saturation of water in the pads.

According to an aspect, the first and second sets of corrugated sheets comprise non-woven material.

The sheets of non-woven material may be treated with substances that increase the life span of the pads and also reduces the need of maintenance of the pads. The substances may be impregnation substances. The sheets of non-woven material may increase the saturation of water in the pads.

According to an aspect, the first and second sets of corrugated sheets are connected to each other at contact areas between wave peaks and wave troughs.

The sheets may be connected to each other by welds. The sheets may be connected to each other by stitches performed by sewing. Alternatively, or in combination, the sheets may be connected to each other by an adhesive, such as glue. The adhesive may be an environment friendly adhesive. The amount and volume of adhesive may be reduced due to reduced contact areas between the sheets.

According to a further aspect of the present disclosure, the air treatment unit may comprise the evaporative cooling pad disclosed herein. The evaporative cooling pad may be arranged in cassettes, which are supported by a rigid frame of the air treatment unit. The air treatment unit comprises a fluid distribution element, which is configured to distribute the fluid to the evaporative cooling pad. A tray is arranged to collect fluid downstream of the evaporative cooling pad. The fluid distributed by the fluid distribution element is collected from the tray. A fluid pump is connected to the fluid distribution element, wherein the fluid pump is configured to deliver fluid to the fluid distribution element. The fluid pump is arranged at a fluid pipe arranged between the tray and the fluid distribution element. The fluid pump may suck the fluid from the tray and deliver the fluid to the fluid distribution element. A fan is configured to generate an air flow through the cooling and humidification media. As the warm and dry air flow passes through the evaporative media, a proportion of the water is evaporated and thus produces cold, humidified air.

According to a further aspect of the present disclosure, a method, performed by a control device, for producing an evaporative cooling pad for an air treatment unit is provided. The evaporative cooling pad comprising: a first set of corrugated sheets and second set of corrugated sheets having corrugations defined in a direction transversely of the horizontal plane of the pad, the sheets of the first set being disposed alternatively with the sheets of the second set, with the corrugations of the first set crossing the corrugations of the second set; said crossed corrugations defining passageways penetrating from edge to edge of the pad, the corrugations of said corrugated sheets bearing against one another so that the sheets touch where at least one of the wave peaks and wave troughs of their respective corrugations cross. The method comprising the steps of: controlling a corrugation device for creating corrugated sheets having at least one wave peak between two wave peaks of equal amplitude of at least one of the first and second set of corrugated sheets with a smaller amplitude than the wave peaks of equal amplitude, and wherein the wave length of the wave troughs on each side of the at least one wave peak with smaller amplitude is smaller than the wave length of the two wave peaks of equal amplitude on each side of the wave peak with smaller amplitude; and controlling a connection operation of first set of corrugated sheets and a second set of corrugated sheets where the corrugations of said corrugated sheets touch one another.

The corrugation device may have a configuration and shape, which creates the corrugated sheets having at least one wave peak between two wave peaks of equal amplitude of at least one of the first and second set of corrugated sheets with a smaller amplitude than the wave peaks of equal amplitude. The corrugation device may be a corrugation roller configured to feed a paper track or a track of non-woven material from a paper roll or a roll of non-woven material. The corrugation device may be a component in a production machine or a line of production machines for producing evaporative cooling pads. Thus, the production machine may comprise unwind station for the paper roll or the roll of non-woven material, an impregnation station, a corrugation station comprising the corrugation device, oven sections for drying the corrugated paper track or the corrugated track of non-woven material, a cutting and stacking station of corrugated sheets. Finally, the first and second sets of corrugated sheets may be connected at an assembling station.

According to a further aspect, controlling the corrugation device comprises perforating the first and second sets of corrugated sheets by a number of through openings. in case the corrugation device is a corrugation roller the penetration elements may be arranged on the surface of the roller, which penetrates the surface of the paper track or a track of non-woven material. Alternatively, the production machine may comprise a separate penetration station for perforating the first and second sets of corrugated sheets by a number of through openings. In the penetration station the through openings may be performed by water jets, laser beams or by drilling. Alternatively, the through openings may be performed by punching or embossing techniques.

According to a further aspect the method, controlling a connection operation of first set of corrugated sheets and a second set of corrugated sheets where the corrugations of said corrugated sheets touch one another comprising connecting the first and second sets of corrugated sheets to each other at contact areas between wave peaks and wave troughs. The sheets may be connected to each other by welding or sewing technics as a method of binding the sheets to each other. Alternatively, or in combination, the sheets may be connected to each other by an adhesive, such as glue. The first and second sets of corrugated sheets may be connected at an assembling station. The assembling station may comprise a robot for the connection operation of the first set of corrugated sheets and the second set of corrugated sheets by welding, sewing or gluing. The glue or adhesive is brought to the contact areas between wave peaks and wave troughs by the robot. The robot may perform the welding or sewing. The robot may be the control device or an activator connected to the control device.

The present disclosure also relates to a computer program comprising instructions which, when the program is executed by a computer, causes the computer to carry out the method disclosed above. The invention further relates to a computer-readable medium comprising instructions, which when executed by a computer causes the computer to carry out the method disclosed above. The method may be comprised in pre-programmed software, which may be implemented into a production unit suitable for utilizing the method. The pre-programmed software may be stored in the control device. Alternatively, or in combination, the software may be stored in a memory or in computer at a distance from the control device.

The evaporative cooling pad, the air treatment unit, the method, the computer program and the computer-readable medium will now be described together with the appended drawings.

FIG. 1a schematically illustrates a front view of an air treatment unit 1 comprising an evaporative cooling pad 2 according to an example. The air treatment unit 1 may be comprised in a cooling system 3. The evaporative cooling pad 2 is configured to be exposed to a fluid 4. The evaporative cooling pad 2 is configured to evaporate the fluid to which it is exposed. The evaporative cooling pad 2 is also known as an evaporative media or a cooling and humidification media 2. The cooling and humidification media may be arranged in cassettes 5 of the air treatment unit 1.

The evaporative cooling pad 2 is configured to receive and evaporate the fluid 4. A fluid distribution element 6 is configured to distribute the fluid 4 to the evaporative cooling pad 2. A tray 8 or water gutter is arranged to collect fluid 4 downstream of the evaporative cooling pad 2. The fluid 4 distributed by the fluid distribution element 6 is collected from the tray 8. A fluid pump 10 is be connected to the fluid distribution element 6, wherein the first fluid pump 10 is configured to deliver fluid 4 to the fluid distribution element 6. The first fluid pump 10 is arranged at a fluid pipe arranged between the tray 8 and the fluid distribution element 6. The first fluid pump 10 may suck the fluid 4 from the tray 8 and deliver the fluid 4 to the fluid distribution element 6. Vertically directed arrows 12 represent the direction of fluid 4 through the fluid distribution element 6, the evaporative cooling pad 2 and further to the fluid tray 8. A fan 14 is configured to generate an air flow 16 (FIG. 1b) through the evaporative cooling pad 2.

Figure 1B:
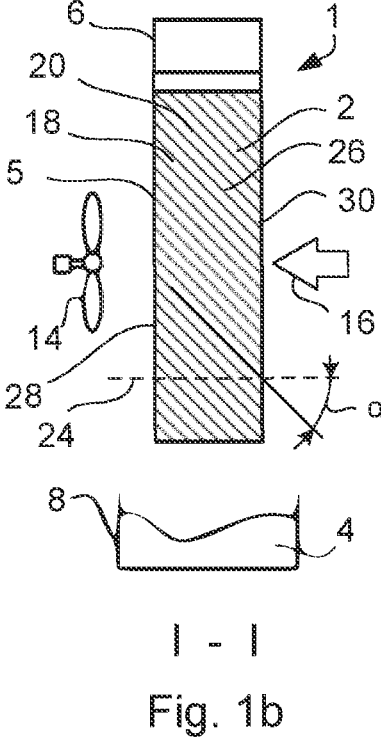

FIG. 1b schematically illustrates a section view along line I-I in FIG. 1a. The evaporative cooling pad 2 comprising a first set 18 of corrugated sheets 20 and a second set 22 of corrugated sheets 20 having corrugations defined in a direction transversely of the horizontal plane 24 of the pad 2. The sheets 20 of the first set 18 being disposed alternatively with the sheets 20 of the second set 22 (FIG. 1c), with the corrugations of the first set 18 crossing the corrugations of the second set 22. The crossed corrugations defining passageways 26 penetrating from a first edge 28 to a second edge 30 of the pad 2. In FIG. 1b the surface of a sheet 20 of the first set 18 is exposed. In FIG. 1*b* the sheets 20 of the first set 18 are directed in an angle α in relation to the horizontal plane 24 of the pad 2.

Figure 1C:
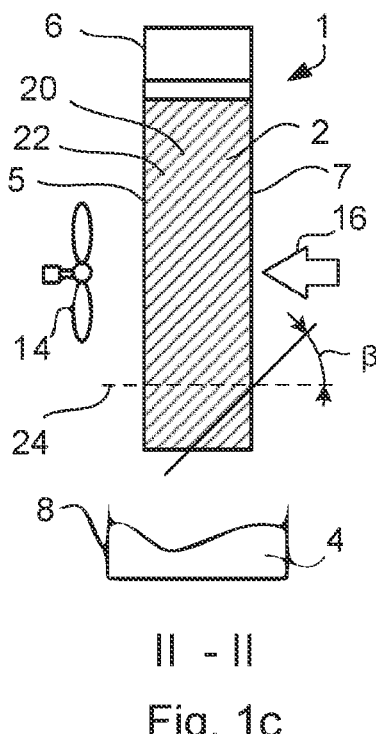

FIG. 1*c* schematically illustrates a section view along line II-II in FIG. 1*a*. In FIG. 1*c* the surface of a sheet 20 of the second set 22 is exposed. In FIG. 1*c* the sheets 20 of the second set 22 are directed in an angle β in relation to the horizontal plane 24 of the pad 2.

Figure 2:
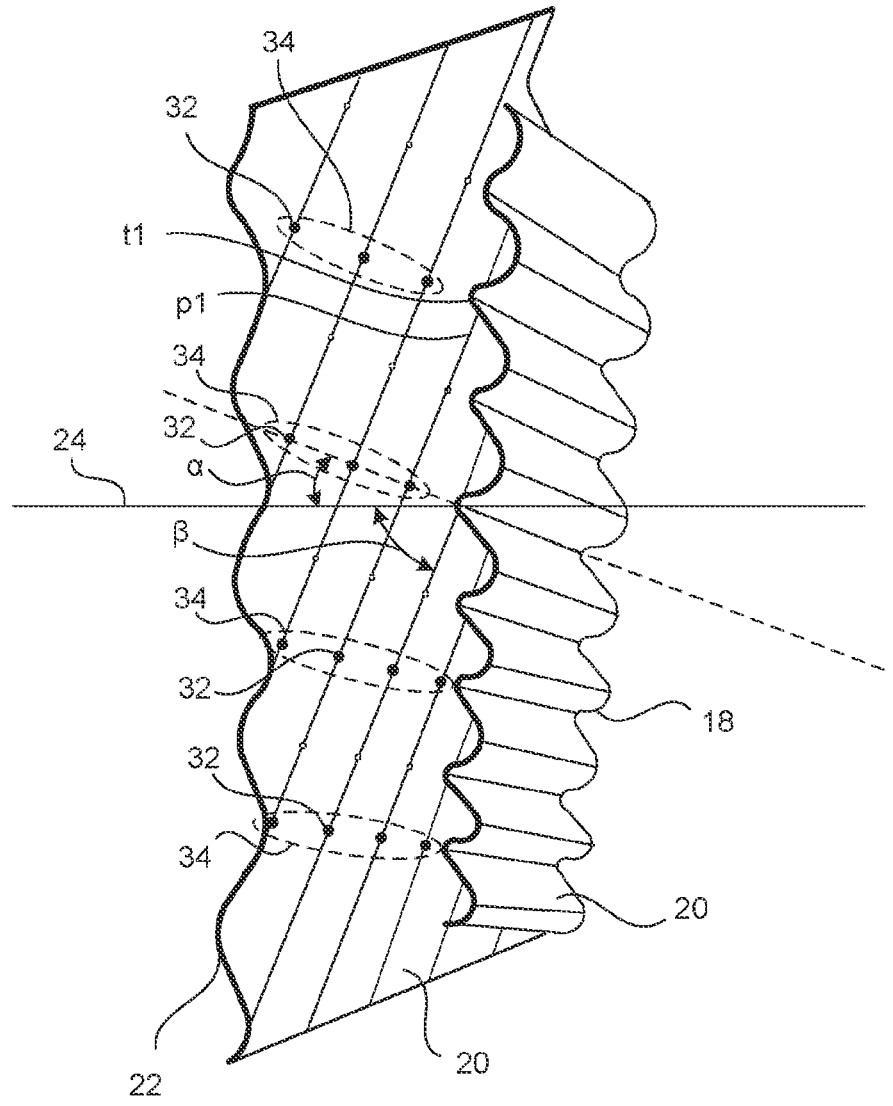
FIG. 2 schematically illustrates a view in perspective of corrugated sheets of a first and second set according to an example.

FIG. 2 schematically illustrates a view in perspective of corrugated sheets 20 of a first and second set 18, 22 according to an example. The corrugations of said corrugated sheets 20 bearing against one another so that the sheets 20 touch where at least one of the wave peaks p1 and wave troughs t1 of their respective corrugations cross. The sheets 20 of the first set 18 are directed α=15° in relation to the horizontal plane 24 of the pad 2. The sheets 20 of the second set 22 are directed β=45° in relation to the horizontal plane 24 of the pad 2. The first and second sets 18, 22 of corrugated sheets are connected to each other at contact areas 34 between wave peaks p1 and wave troughs t1. The first and second sets 18, 22 of corrugated sheets 20 may be connected to each other by welding or sewing technics. Alternatively, or in combination, the sheets may be connected to each other by an adhesive 32, such as glue.

Figure 3A:
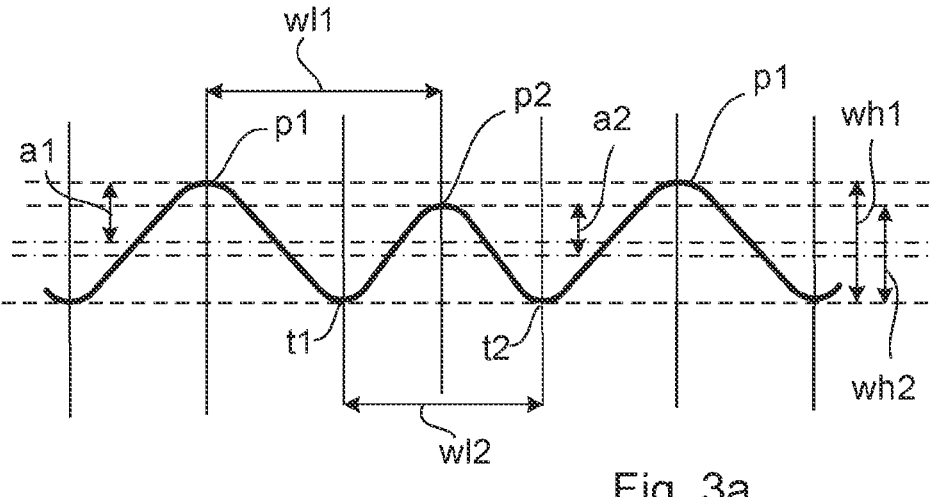
FIGS. 3a-3c schematically illustrate side views of corrugated sheets of different configurations according to examples.
Figure 3B:
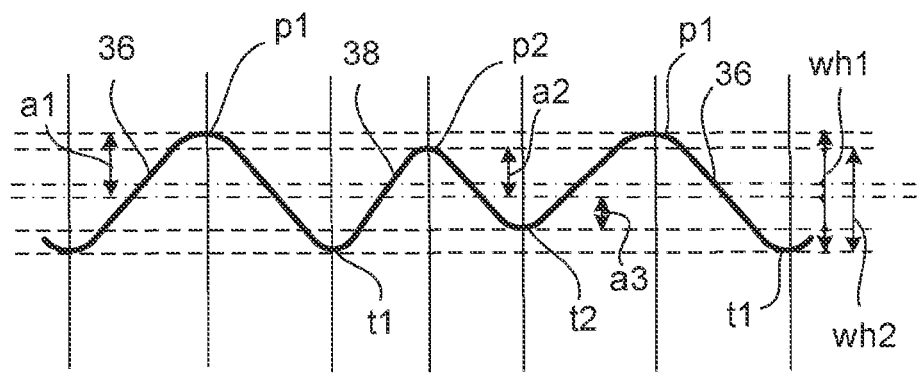
Figure 3C:
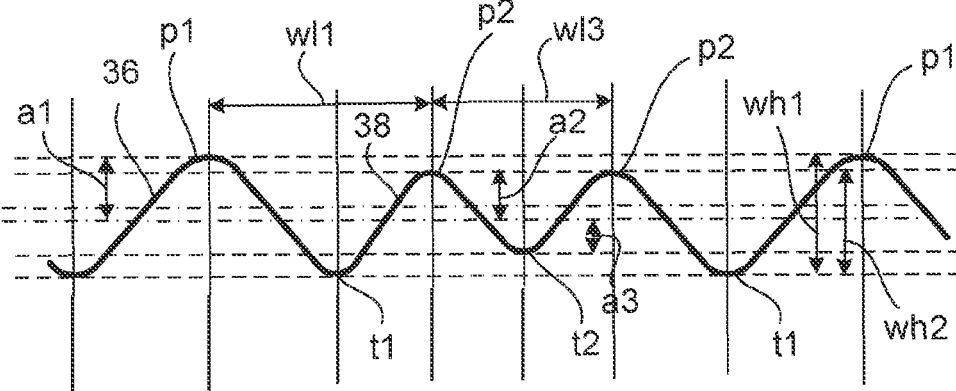

FIGS. 3*a*-3*c* schematically illustrate side views of corrugated sheets 20 of different configurations according to examples. According to FIG. 3*a* one wave peak p2 between two wave peaks p1 of equal amplitude a1 of the first and second set 18, of corrugated sheets 20 has a smaller amplitude a2 than the wave peaks p1 of equal amplitude a1. The wave length wl2 of the wave troughs t1, t2 on each side of the wave peak p2 with smaller amplitude a2 is smaller than the wave length wl1 of the two wave peaks p1 of equal amplitude a1 on each side of the wave peak p2 with smaller amplitude a2. According to FIG. 3*b* one of the wave troughs t2 on each side of the wave peak p2 with smaller amplitude a2 has a smaller amplitude a3 than the other wave trough t1. Between the waves 36 with large wave heights wh1 the wave with a smaller or reduced wave height wh2 has a wave peak p2 with reduced amplitude a2 and a wave trough t2 with reduced amplitude a3. According to FIG. 3*c* two consecutive wave peaks p2 between two wave peaks p1 of equal amplitude a1, have a smaller amplitude a2 than the wave peaks p1 of equal amplitude a1. Between the waves 36 with large wave heights wh1 two waves 38 with smaller or reduced wave height wh2 have wave peaks p2 with reduced amplitude a2. The two consecutive wave peaks p2 between two waves 36 of equal amplitude a1, have a wave trough t2 there between with an amplitude a3 which is smaller than the amplitude a1 of the wave peaks p1 of equal amplitude a1 on each side of the wave peaks p2 with smaller amplitudes a2. The wave length wl3 of the two consecutive wave peaks p2 between the two waves 36 of equal amplitude a1 having a smaller amplitude a2 than the wave peaks p1 of equal amplitude a1 is smaller than the wave length wl1 of the two waves 36 of equal amplitude a1.

Figure 4:
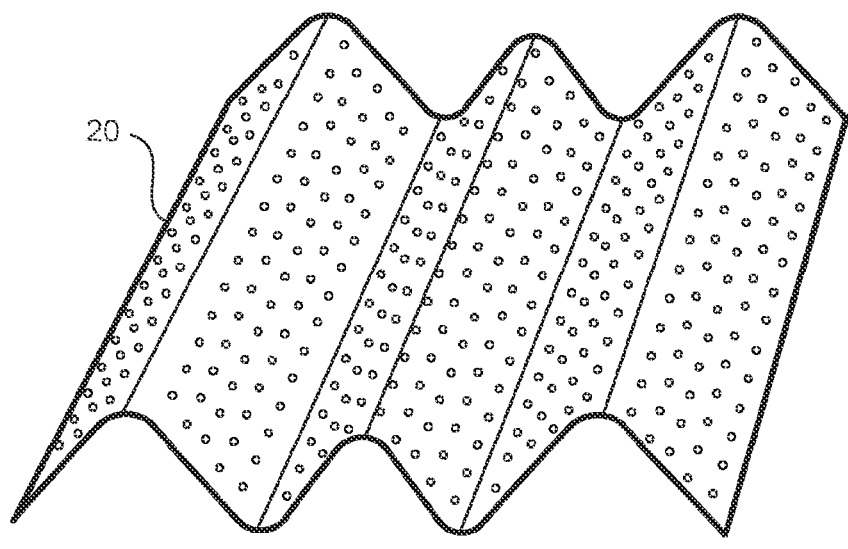
FIG. 4 schematically illustrates a view in perspective of a corrugated sheet according to an example.

FIG. 4 schematically illustrates a view in perspective of a corrugated sheet 20 according to an example. The corrugated sheet 20 in FIG. 4 may represent the first or the second set 18, 22 of corrugated sheets 20. The corrugated sheet 20 according to this example is perforated by a number of perforations or through openings 40. The number of perforations 40 is large. The through openings 40 have a circular configuration.

Figure 5:
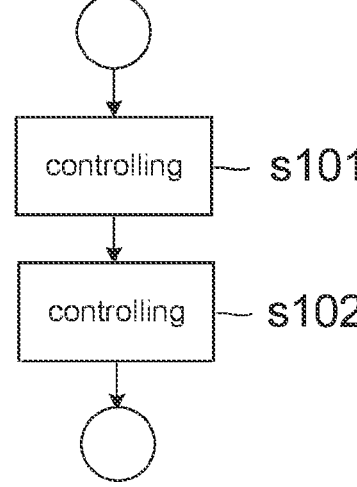
FIG. 5 shows a flowchart of a method according to an example.

FIG. 5 shows a flowchart of a method according to an example. The method is performed by a control device 100, for producing an evaporative cooling pad 2 for an air treatment unit 1. The method relates to the evaporative cooling pad 2 for the air treatment unit 1 disclosed in FIGS. 1-4. The evaporative cooling pad 2 comprising: a first set 18 of corrugated sheets 20 and second set 22 of corrugated sheets 20 having corrugations defined in a direction transversely of the horizontal plane 24 of the pad 2.

The sheets 20 of the first set 18 being disposed alternatively with the sheets 20 of the second set 22, with the corrugations of the first set 18 crossing the corrugations of the second set 22. The crossed corrugations defining passageways 26 penetrating from a first edge 28 to second edge 30 of the pad 2. The corrugations of said corrugated sheets 20 bearing against one another so that the sheets 20 touch where at least one of the wave peaks p1 and wave troughs t1 of their respective corrugations cross. The method comprising the steps of: controlling s101 a corrugation device 42 for creating corrugated sheets 20 having at least one wave peak p2 between two wave peaks p1 of equal amplitude a1 of at least one of the first and second set 18, 22 of corrugated sheets 20 with a smaller amplitude a2 than the wave peaks p1 of equal amplitude a1; and controlling s102 a connection operation of first set 18 of corrugated sheets 20 and a second set 22 of corrugated sheets 20 where the corrugations of said corrugated sheets 20 touch one another. Controlling the corrugation device 42 comprises perforating the first and second sets 18, 22 of corrugated sheets 20 by a number of through openings 40.

Figure 6:
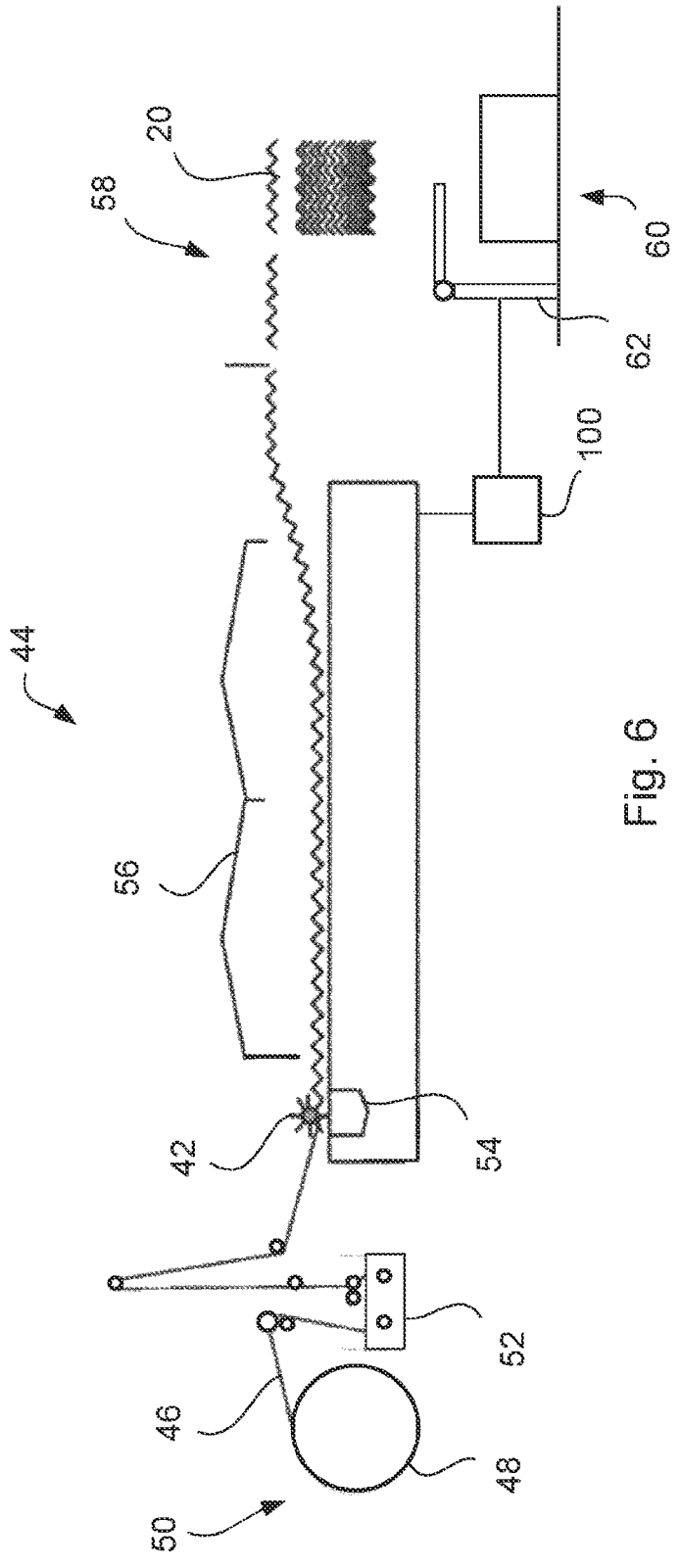
FIG. 6 schematically illustrates a production line according to an example.

FIG. 6 schematically illustrates a production line 44 according to an example. The corrugation device 42 may be a corrugation roller, which has a configuration and shape, which creates the corrugated sheets 20 having at least one wave peak p2 (FIG. 3*a*-3*c*) between two wave peaks p1 of equal amplitude a1 of at least one of the first and second set 18, 22 of corrugated sheets 20 with a smaller amplitude a2 than the wave peaks p1 of equal amplitude a1. The corrugation roller 42 may be configured to feed a paper track 46 or a track of non-woven material from a paper roll 48 or a roll of non-woven material. The corrugation roller 42 is a component in line 44 of production machines for producing evaporative cooling pads 2. Thus, the production line 44 may comprise an unwind station 50 for the paper roll 48 or the roll of non-woven material, an impregnation station 52, a corrugation station 54 comprising the corrugation roller 42, oven sections 56 for drying the corrugated paper track 46 or the corrugated track of non-woven material, a cutting and stacking station 58 of corrugated sheets 20 and finally an assembling station 60 for the connection operation of first set 18 of corrugated sheets 20 and a second set 22 of corrugated sheets 20 where the corrugations of said corrugated sheets 20 touch one another. The assembling station 60 may comprise a robot 62 for the connection operation of the first set 18 of corrugated sheets 20 and a second set 22 of corrugated sheets 20 by welding, sewing or gluing.

Figure 7:
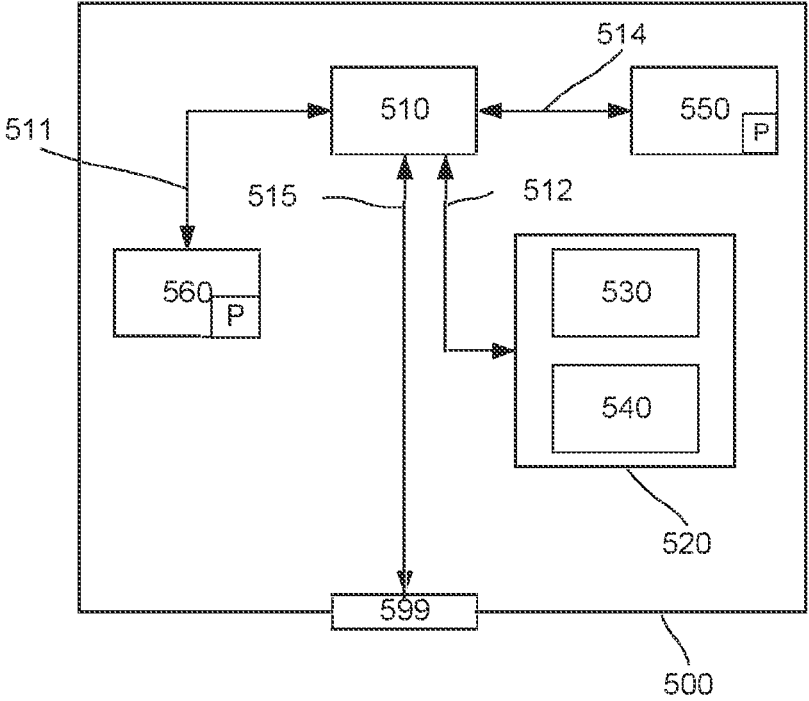
FIG. 7 schematically illustrates a control device or computer according to an example.

FIG. 7 schematically illustrates a diagram of a version of a device 500. The control device 100 described with reference to FIGS. 2-3 may in a version comprise the device 500. The device 500 comprises a non-volatile memory 520, a data processing unit 510 and a read/write memory 550. The non-volatile memory 520 has a first memory element 530 in which a computer programme, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory 520 has also a second memory element 540.

There is provided a computer programme P which comprises instructions for carry out the above-mentioned method. The programme P may be stored in an executable form or in a compressed form in a memory 560 and/or in a read/write memory 550. Where the data processing unit 510 is described as performing a certain function, it means that the data processing unit 510 effects a certain part of the programme stored in the memory 560 or a certain part of the programme stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit 510 via a data bus 511. The read/write memory 550 is adapted to communicating with the data processing unit 510 via a data bus 514.

When data are received on the data port 599, they are stored temporarily in the second memory element 540. When input data received have been temporarily stored, the data processing unit 510 is prepared to effect code execution as described above. Parts of the methods herein described may be effected by the device 500 by means of the data processing unit 510 which runs the programme stored in the memory 560 or the read/write memory 550. When the device 500 runs the programme, methods herein described are executed.

The foregoing description of the embodiments has been furnished for illustrative and descriptive purposes. It is not intended to be exhaustive, or to limit the embodiments to the variations described. Many modifications and variations will obviously be apparent to one skilled in the art. The embodiments have been chosen and described in order to best explicate principles and practical applications, and to thereby enable one skilled in the arts to understand the invention in terms of its various embodiments and with the various modifications that are applicable to its intended use. The components and features specified above may, within the frame work of the disclosure, be combined between different embodiments specified.

The invention claimed is:

1. An evaporative cooling pad for an air treatment unit, the evaporative cooling pad comprising:

a first set of corrugated sheets and a second set of corrugated sheets having corrugations defined in a direction transversely of a horizontal plane of the pad, the sheets of the first set being disposed alternatively with the sheets of the second set, with the corrugations of the sheets of the first set crossing the corrugations of the sheets of the second set; the crossed corrugations defining passageways penetrating from a first edge to a second edge of the pad, the corrugations of the corrugated sheets bearing against one another so that the sheets touch where at least one of the wave peaks and wave troughs of their respective corrugations cross, wherein at least one wave peak between two wave peaks of equal amplitude of at least one of the first and second set of corrugated sheets has a lower amplitude than the wave peaks of equal amplitude, and wherein the wavelength of the wave troughs on each side of the at least one wave peak with lower amplitude is shorter than the wavelength of the two wave peaks of equal amplitude on each side of the wave peak with lower amplitude.

2. The pad according to claim 1, wherein at least one of the wave troughs on one side of the at least one wave peak with lower amplitude has a lower amplitude than the other wave trough.

3. The pad according to claim 1, wherein at least two consecutive wave peaks between two wave peaks of equal amplitude have a lower amplitude than the wave peaks of equal amplitude.

4. The pad according to claim 3, wherein the at least two consecutive waves peaks between two waves peaks of equal amplitude have a wave trough therebetween with an amplitude which is lower than the amplitude of the wave peaks of equal amplitude on each side of the wave peaks with lower amplitudes.

5. The pad according to claim 4, wherein the wavelength of the at least two consecutive waves peaks between the two wave peaks of equal amplitude having a lower amplitude than the wave peaks of equal amplitude is shorter than the wavelength of the two wave peaks of equal amplitude.

6. The pad according to claim 1, wherein the first and second sets of corrugated sheets are perforated by a number of through-openings.

7. The pad according to claim 1, wherein the first and second sets of corrugated sheets comprise paper.

8. The pad according to claim 1, wherein the first and second sets of corrugated sheets comprise non-woven material.

9. The pad according to claim 1, wherein the first and second sets of corrugated sheets are connected to each other at contact areas between wave peaks and wave troughs.

10. An air treatment unit comprising an evaporative cooling pad according to claim 1.

11. A method for producing an evaporative cooling pad for an air treatment unit, the evaporative cooling pad comprising a first set of corrugated sheets and second set of corrugated sheets having corrugations defined in a direction transversely of a horizontal plane of the pad, the sheets of the first set being disposed alternatively with the sheets of the second set, with the corrugations of the first set crossing the corrugations of the second set; the crossed corrugations defining passageways penetrating from a first edge to a second edge of the pad, the corrugations of the corrugated sheets bearing against one another so that the sheets touch where at least one of the wave peaks and wave troughs of their respective corrugations cross, the method comprising the steps of:

controlling a corrugation device for creating corrugated sheets having at least one wave peak between two wave peaks of equal amplitude of at least one of the first and second set of corrugated sheets with a lower amplitude than the wave peaks of equal amplitude and wherein the wavelength of the wave troughs on each side of the at least one wave peak with lower amplitude is shorter than the wavelength of the two wave peaks of equal amplitude on each side of the wave peak with lower amplitude; and controlling a connection operation of the first set of corrugated sheets and the second set of corrugated sheets where the corrugations of the corrugated sheets touch one another.

12. The method according to claim 11, wherein controlling the corrugation device comprises perforating the first and second sets of corrugated sheets by a number of through-openings.

13. The method according to claim 11, wherein controlling a connection operation of the first set of corrugated sheets and the second set of corrugated sheets where the corrugations of the corrugated sheets touch one another comprises connecting the first and second sets of corrugated sheets to each other at contact areas between wave peaks and wave troughs.

14. A computer program stored on a non-transitory medium and comprising instructions which, when the program is executed by a computer, cause the computer to carry out the method according to claim 11.

15. A non-transitory, computer-readable medium comprising instructions, which when executed by a computer, cause the computer to carry out the method according to claim 11.

* * * * *